US012155757B2

(12) United States Patent
Taylor et al.

(10) Patent No.: US 12,155,757 B2
(45) Date of Patent: Nov. 26, 2024

(54) SYSTEMS AND METHODS FOR DEPLOYMENT, MANAGEMENT AND USE OF DYNAMIC CIPHER KEY SYSTEMS

(71) Applicants: James Taylor, Potomac Falls, VA (US); John Dwyier, Chantilly, VA (US); Joseph Lawn, Arlington, VA (US); Glen Gulyas, Arlington, VA (US)

(72) Inventors: James Taylor, Potomac Falls, VA (US); John Dwyier, Chantilly, VA (US); Joseph Lawn, Arlington, VA (US); Glen Gulyas, Arlington, VA (US)

(73) Assignee: Onclave Networks, Inc., Sterling, VA (US)

( * ) Notice: Subject to any disclaimer, the term of this patent is extended or adjusted under 35 U.S.C. 154(b) by 0 days.

(21) Appl. No.: 17/587,160

(22) Filed: Jan. 28, 2022

(65) Prior Publication Data

US 2022/0158832 A1 May 19, 2022

Related U.S. Application Data

(63) Continuation of application No. 16/705,518, filed on Dec. 6, 2019, now Pat. No. 11,271,730, which is a (Continued)

(51) Int. Cl.
*H04L 29/06* (2006.01)
*H04L 9/08* (2006.01)
(Continued)

(52) U.S. Cl.
CPC .......... *H04L 9/0861* (2013.01); *H04L 9/0877* (2013.01); *H04L 9/14* (2013.01);
(Continued)

(58) Field of Classification Search
CPC ... H04L 63/0428; H04L 63/06; H04L 63/062; H04L 9/3234; H04L 63/0272;
(Continued)

(56) References Cited

U.S. PATENT DOCUMENTS 10,805,393 B2\* 10/2020 Grefen ................ H04L 67/1097
2016/0283941 A1\* 9/2016 Andrade ............ G06Q 20/3829
(Continued)

*Primary Examiner* — Tri M Tran
(74) *Attorney, Agent, or Firm* — Michael P. Fortkort, Esq.; PROTORAE LAW, PLLC

(57) ABSTRACT

Dynamic Cipher Key Management (DCKM) of the present invention enables the protection of sensitive electronic data by assigning symmetric or asymmetric cipher keys using a process that delivers the cipher key to a network endpoint device by means of a key installation, delivery, and storage methodology. DCKM may negate the need to physically touch the network device under protection. Further, DCKM's process is based on a set of operating principles that maintains the highest levels of assurance that the cipher key pairs are issued with only devices that have the right and authorization to create a secure communication path. The DCKM process realizes the same level of security confidence that is only achieved today with conventional token based key management services with respect to the paired devices linked via a cipher key public and private relationship.

18 Claims, 6 Drawing Sheets

Related U.S. Application Data continuation of application No. 15/668,521, filed on Aug. 3, 2017, now abandoned.

(60) Provisional application No. 62/370,567, filed on Aug. 3, 2016.

(51) Int. Cl.
*H04L 9/14* (2006.01)
*H04L 9/32* (2006.01)
*H04L 9/40* (2022.01)
*H04L 9/00* (2022.01)

(52) U.S. Cl.
CPC .......... *H04L 9/3234* (2013.01); *H04L 9/3236* (2013.01); *H04L 63/0272* (2013.01); *H04L 63/0428* (2013.01); *H04L 63/06* (2013.01); *H04L 63/062* (2013.01); *H04L 9/50* (2022.05)

(58) Field of Classification Search
CPC . H04L 9/0861; H04L 2209/38; H04L 9/0877; H04L 9/14; H04L 9/3236
See application file for complete search history.

(56) References Cited

U.S. PATENT DOCUMENTS

2017/0317997 A1* 11/2017 Smith ................ G06Q 20/3829
2017/0344580 A1* 11/2017 King .................... H04L 9/3247

* cited by examiner

SYSTEMS AND METHODS FOR DEPLOYMENT, MANAGEMENT AND USE OF DYNAMIC CIPHER KEY SYSTEMS

PRIORITY CLAIM

This application is a continuation of U.S. patent application Ser. No. 16/705,518 filed Dec. 6, 2019, which is a continuation of U.S. patent application Ser. No. 15/668,521 filed Aug. 3, 2017 which claims priority from U.S. provisional application Ser. No. 62/370,567 filed on Aug. 3, 2016 the contents of which are hereby incorporated by reference in its entirety.

BACKGROUND OF THE INVENTION

In cryptography, a cipher is typically an algorithm for performing encryption or decryption. This is usually a series of well-defined steps that can be followed as a procedure. An alternative, but less common term is encipherment. To encipher or encode is to convert information into cipher or code. In common parlance, "cipher" is synonymous with "code", as they are both a set of steps that encrypt a message; however, the concepts are distinct in cryptography, especially classical cryptography.

Codes generally substitute different length strings of characters in the output, while ciphers generally substitute the same number of characters as are input. There are exceptions and some cipher systems may use slightly more, or fewer, characters when output versus the number that were input.

Codes operated by substituting according to a large codebook which are linked to a random string of characters or numbers to a word or phrase. For example, "UQJHSE" could be the code for "Proceed to the following coordinates." When using a cipher the original information is known as plaintext, and the encrypted form as ciphertext. The ciphertext message contains all the information of the plaintext message, but is not in a format readable by a human or computer without the proper information or mechanism to decrypt it.

The operation of a cipher usually depends on a piece of auxiliary information, called a key (or, in traditional NSA parlance, a cryptovariable). The encrypting procedure is varied depending on the key, which changes the detailed operation of the algorithm. A key must be selected before using a cipher to encrypt a message. Without knowledge of the key, it is extremely difficult, if not impossible, to decrypt the resulting ciphertext into readable plaintext.

Most modern ciphers can be categorized in several ways. For example, they may work on blocks of symbols (block ciphers) usually of a fixed size, or on a continuous stream of symbols (stream ciphers). In some cases, the same key is used for both encryption and decryption (symmetric key algorithms), or if a different key is used for each (asymmetric key algorithms). If the algorithm is symmetric, the key must be known to the recipient and sender and to no one else. If the algorithm is an asymmetric one, the enciphering key is different from, but closely related to, the deciphering key. If one key cannot be deduced from the other, the asymmetric key algorithm usually has a public/private key property and one of the keys may be made public without loss of confidentiality.

In a symmetric key algorithm (e.g., DES and AES), the sender and receiver must have a shared key set up in advance and which is kept secret from other parties. The sender uses this key for encryption, and the receiver uses the same key for decryption. One type of cipher, the Feistel cipher uses a combination of substitution and transposition techniques. Most block cipher algorithms are based on this structure. In an asymmetric key algorithm system (e.g., RSA), there are two separate keys: a public key that is published and enables any sender to perform encryption, while a private key is kept secret by the receiver and enables only him to perform correct decryption.

Cipher block chaining (CBC) is a mode of operation for a block cipher (one in which a sequence of bits are encrypted as a single unit or block with a cipher key applied to the entire block). Usually in an iterative way. Cipher block chaining uses what is known as an initialization vector (IV) of a certain length. One of its key characteristics is that it uses a chaining mechanism that causes the decryption of a block of ciphertext to depend on all the preceding ciphertext blocks. As a result, the entire validity of all preceding blocks is contained in the immediately previous ciphertext block. A single bit error in a ciphertext block affects the decryption of all subsequent blocks. Rearrangement of the order of the ciphertext blocks causes decryption to become corrupted. Basically, in cipher block chaining, each plaintext block is digitally processed using an exclusive OR (XOR) operation on the immediately previous ciphertext block, and then encrypted.

Within the construct of the aforementioned encryption and decryption methods for cypher keys, three forms of key management are typically employed. The method of deployment maps to the need and scale of the cypher key requirements Native Key Management tools utilize the basic key management capabilities that are native to the individual encryption product or products being deployed. Localized Key Management tools better manage risk and ensure control of the entire cipher key life cycle. Centralized Key Management are used in larger scale deployments where the scale of the key management requirements necessitate the automation of the cipher key life cycle and the amalgamation of key management policies. This approach establishes a demarcation between the cipher key management tasks performed centrally and the endpoint device functions where the keys are actually used.

The existing forms of key management have several drawbacks in so far as; efficient deployment of cypher keys, human intervention in the deployment of new cypher keys, and risks in how the keys themselves are issued. In the case of Centralized Key Management, most require either a public or private Certificate Authority that issues public or private certificates used to establish a key pair. There is a considerable amount of human intervention during this period and cost for public keys when securing these certificates. Further, since the certificate can be easily hijacked, a man-in-the-middle attack (MITM) is far more likely.

SUMMARY OF THE INVENTION

It is therefore an object of the present invention to provide systems and methods that provide secure management of cipher keys across a network.

It is therefore also an object of the present invention to provide systems and methods that provide secure management of cipher keys across large and very large computer network.

It is therefore an object of the present invention to provide systems and methods that provide secure management of cipher keys across a network without periodic human intervention.

It is therefore also an object of the present invention to provide secure dynamic cipher key management to enable the secure communication of trusted devices.

It is therefore also an object of the present invention to provide an amalgamated rule based cipher key management policy that adheres to the NIST Special Publication 800-57 Part 1 Revision 4 guidelines while providing dynamic creation and delivery of cipher keys.

It is therefore also an object of the present invention to store and forward private keys utilizing the present invention's private multi-segment Blockchain technology for extremely large scale key management of endpoint devices.

These and other objects of the present invention are accomplished by providing methods apparatuses that, in one embodiment, allow a computer network system to store and forward cipher keys using a blockchain decryption approach that provides a scalable cipher key management environment and robust deployment and maintenance over large and very large networks. This established a way to create a novel safe and adaptable network environment for the exchange of electronic information over a cryptographically secured network connection.

Other aspects of the invention are directed toward enabling the protection of sensitive electronic data by assigning symmetric or asymmetric cipher keys, based on certain commonly used cipher algorithms, using a novel process that delivers a cipher key to a network endpoint device by means of a novel key installation and delivery methodology. Such embodiments may employ the Dynamic Cipher Key Management (DCKM) system of the present invention as further described herein.

In at least some embodiments, DCKM enabled network devices will fully or partially negate the need to physically touch the network device.

Further, processes in accordance with certain paradigms of the present invention, which can include DCKM, may be based on a set of operating principles that maintains high levels of assurance that cipher key pairs are issued substantially exclusively (or exclusively) with devices that have both the right and authorization to create a secure communication path. The DCKM process realizes the same (or higher) level of security confidence that is only achieved today with conventional token based key management services with respect to the paired devices linked via a cipher key public and private relationship.

In some embodiments, the DCKM system of the present invention will work with various known cipher algorithms such as AES, DES, TripleDES as well as the two major types of public-key ciphers used today: Diffie-Hellman and RSA. However, other similar or suitable cipher algorithms may be used if desired. The DCKM system using the various know cipher algorithms will also have its own root of trust negating the need for public or private Certificate Authorities.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1A:
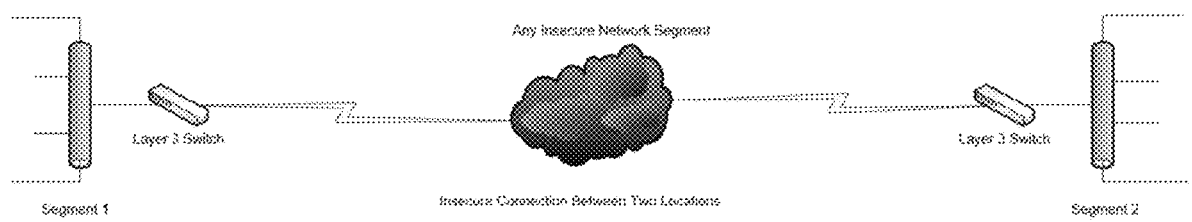
FIG. 1A is a generalized block system diagram illustrating a typical LAN—WAN—LAN link that connects Segment 1 to Segment 2 via a layer 3 switch over the Internet.

Prior art systems use a number of methods to create a key pair that can be used to establish cryptographic sleeves between devices. The most common is the Public Key Infrastructure (PKI). Once a PKI structure is established, each entity wishing to communicate securely is required to physically prove his or her identity to a Registration Authority (RA). This identity-proving process requires the presentation of proper credentials. After establishing the correct identity, an individual then generates a public static key pair. Each individual that generates a key pair is considered to be the owner of that key pair. The public key of the key pair is provided to the RA, where it is incorporated with the key-pair owner's identifier and other information into a digitally signed message for transmission to a Certification Authority (CA). The CA then composes the key-pair owner's public-key certificate by signing the owner's public key and the identifier, along with other information. This certificate is returned to the key-pair owner or placed in a certificate repository or both. The private key remains under the sole control of the owner. Two types of public key certificates are commonly used: certificates used for key establishment (i.e., key agreement or key transport) and certificates used for digital signatures.

In the case of key-agreement certificates, two entities wishing to communicate may exchange public-key certificates containing public static key-agreement keys that are checked by verifying the CA's signature on the certificate (using the CA's public key). The public static key-agreement key of each of the two entities and each entity's own private static key-agreement key are then used in a key-agreement scheme to produce a shared secret that is known by the two entities. The shared secret may then be used to derive one or more shared symmetric keys to be used by a symmetric algorithm to provide confidentiality and/or integrity protection for data. The receiver of the data protected by the symmetric key(s) has assurance that the data came from the other entity indicated by the public-key certificate (i.e., source authentication for the symmetric keys has been obtained).

PKI is a very labor-intensive key management entity requiring human intervention in the establishment of key pairs. The nature of PKI precludes its use in environments that require the protection of data in motion to the millions of devices commonly known as the Internet of Things (IoT).

One embodiment of the present invention provides greater protection against man-in-the-middle attacks and leverages a new approach integrated with a Trusted Platform Module (TPM) chip providing the seed for the hash generation. This approach provides the highest level of security and removes all human intervention after the initialization of the pairing of a master and slave device.

This new and novel architecture approach assures the independent security of the protected enclave and furthers the management of switching the slave device ON or OFF based on the policy of the enclave.

Since each TPM chip has a substantially unique and secret key burned in as it is produced, it can be used to perform platform authentication. This moves activation from a physical key to a highly scalable and independent endpoint configuration, as in the ability to switch out, or exchange, cameras within an enclave.

Using TPM chips provide a number of benefits that include:
  Their ability to generate cryptographic keys, and limit the key's use by policy.
  Remote attestation—creates a nearly unforgeable hash key summary of the hardware and software configuration. The program hashing the configuration data determines the extent of the summary of the software. This allows a third party to verify that the software has not been changed.
  Binding—encrypts data using TPM bind key, a unique RSA key descended from a storage key.
  Sealing—encrypts data in a similar manner to binding, but in addition specifies a state in which TPM must be in, in order for the data to be decrypted (unsealed).

Figure 1B:
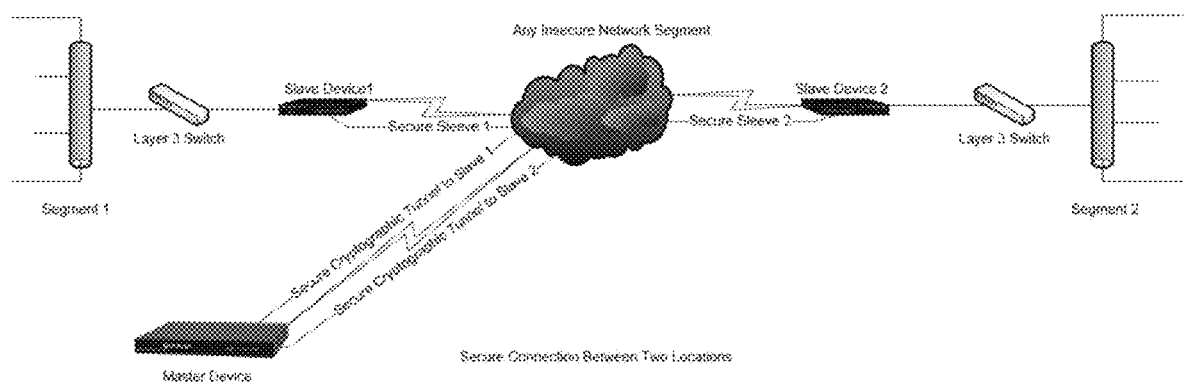
FIG. 1B is a generalized block system diagram illustrating a LAN—WAN—LAN link of in accordance with aspects of the present invention.
Figure 1C:
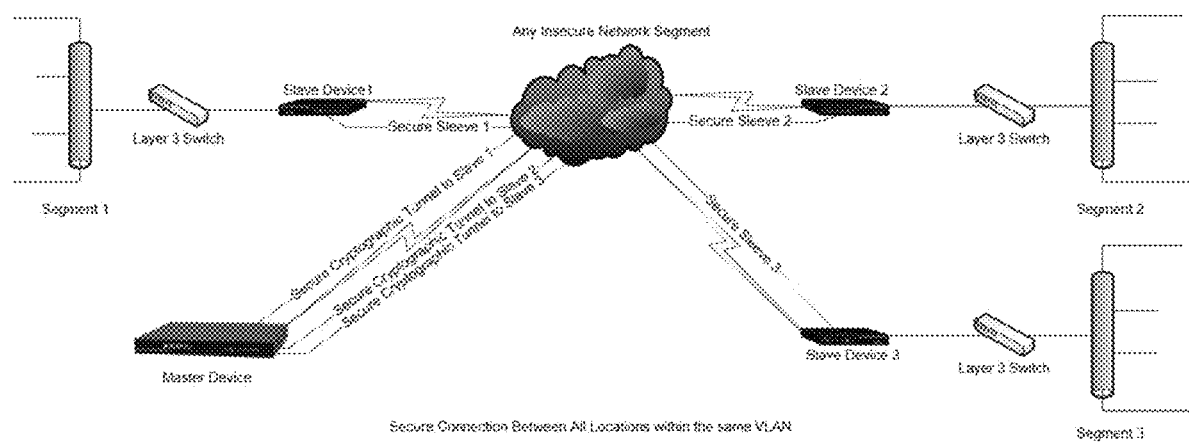
FIG. 1C is a generalized block system diagram illustrating a LAN—WAN—LAN link of the present invention that illustrates the extensibility of the Master/Slave devices and that Point to Point and Point to Multi Point key management can be easily implemented.

DCKM of the present invention provides a cipher key management framework that enables expansion of a cryptographic secure enclave by enabling the dynamic addition of slave devices linked to a common master with a trust relationship as shown in FIG. 1C.

One embodiment of the invention may use a process that distinguishes the present invention from the prior art is that it creates a framework and establishes a rule based state transition methodology which may impose mutual consent and a set of actions based on the current state of involved network devices that are negotiating with each other in the data transfer process. In some embodiments, these rules dictate that substantially all parties including devices and operators have been trusted in advanced by participating organizations that are providing the devices. In certain embodiments, acquiring parties of the devices must identify at least one trusted operator of the devices purchased.

FIG. 1A is a generalized block system diagram illustrating a typical prior art LAN—WAN—LAN link that connects Segment 1 to Segment 2 via a layer 3 switch over the Internet. In this depiction, there is no protection of the links between the two segments. Accordingly, the packets traversing the WAN connection can easily be captured and used to penetrate either segment and any devices or endpoints that may exit on those segments.

FIG. 1B is a generalized block system diagram in accordance with aspects of the present invention illustrating a LAN—WAN—LAN link that connects Segment 1 to Segment 2 via a layer 3 switch and participating DCKM devices providing layer 2 over layer 3 encryption over the internet. The Master/Slave devices could be third party manufactured devices using the DCKM system for key management. In accordance with one embodiment of the present invention, the Master/Slave devices would establish a trust relationship between themselves, only after an authorized user (administrator) of the Master device was authenticated to perform DCKM Key Management. After authorization, the user could establish which slave devices would be used to create a secure cryptographic tunnel between the participating slave devices, thus creating a secure enclave invisible to the anyone or anything on the internet.

FIG. 1C is a generalized block system diagram in accordance with aspects of the present invention illustrating a LAN—WAN—LAN link that connects Segment 1, Segment 2, and Segment 3 via layer 3 switches and participating DCKM devices providing layer 2 over layer 3 encryption over the internet. This illustrates the extensibility of the Master/Slave devices and that Point to Point and Point to Multi Point key management can be easily implemented.

Figure 2:
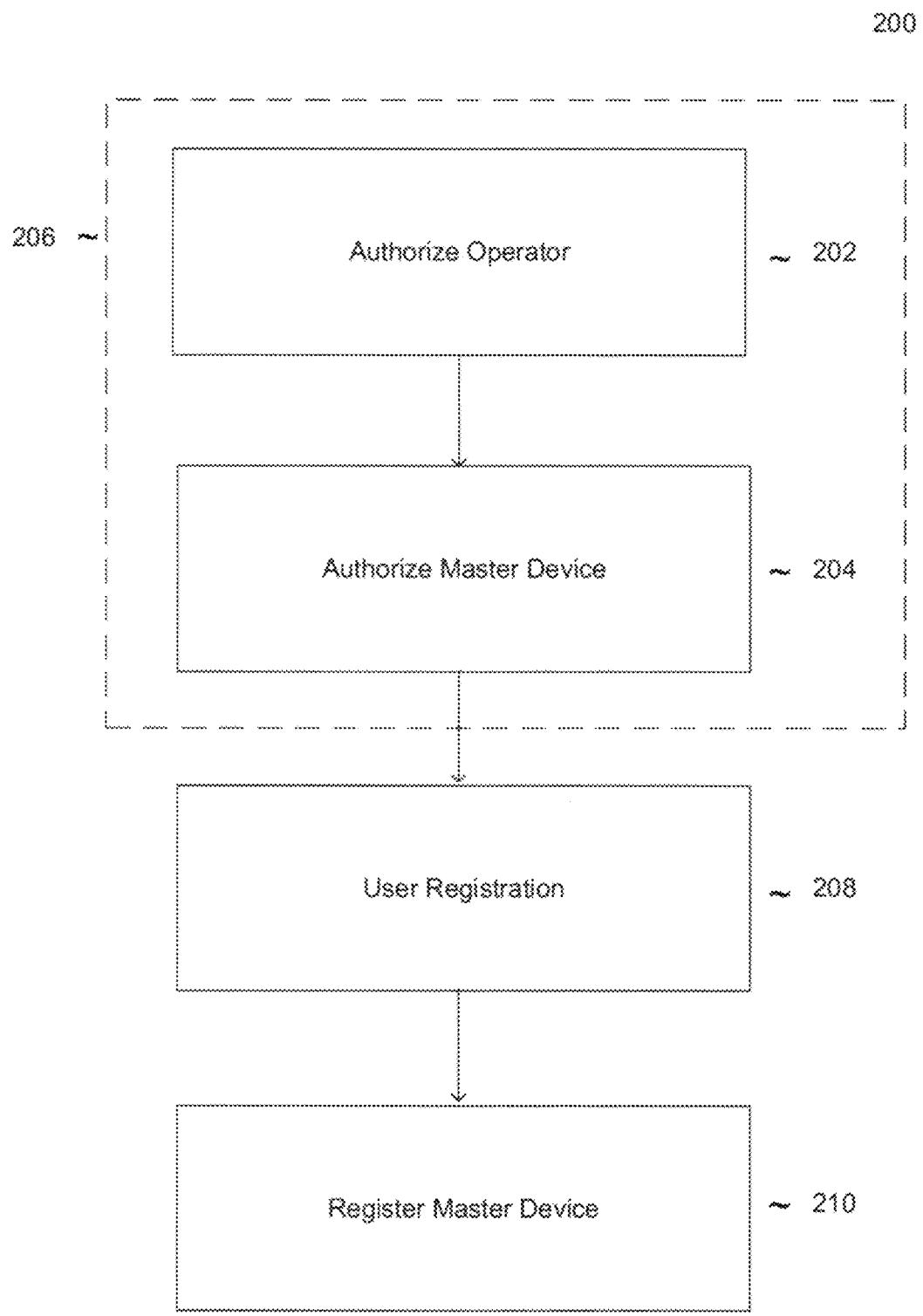
FIG. 2 shows a flow chart illustrating some of the steps involved in establishing an authorized user with a master device in accordance with one embodiment of the present invention.

FIG. 2 shows a flow chart 200 illustrating some of the steps involved in establishing a dynamic cipher key management framework in accordance with one aspect of the invention ("DCKM"). At step 202, an operator (such as an administrator that is given a user name and password to the master device) is identified as linked to a specific master device. A master device may be, for example, a layer 2 encryptor or any similar or other suitable hard wired network or mobile device capable of establishing a secure cryptographic tunnel using a key pair exchange. Next, at step 204, the operator may be assigned to the master device as an authorized operator (i.e., an operator that can securely communicate across the network through the master device using the DCKM technology described herein). Collectively, steps 202 and 204 may be thought of as a "pre-operational phase" and are labeled as step 206. In some embodiments, these steps may be performed sequentially or together (substantially in parallel).

After step 206 is complete, the master device may be paired with one or more slave device (s) to establish secure communicate paths through a network such as the Internet, a WAN of LAN. The slave device could be a network element that contains one or more RJ45 network connections and has the TPM chip to establish a trust relationship along with a CPU to perform encryption and decryption between other slave devices and the master device. Next, at step 208, when an organization implements the DCKM solution of the present invention to establish a cipher key pair between a master device and a slave device, the organization first registers one or more of its members as users which are identified to the network as operators of the master device. Lastly, at step 210 the master devices may be registered to one or more users as an administrator.

In the framework described in FIG. 2, implementation of the DCKM system of the present invention is typically dependent having an authorized operator, at least one master device and one or more slave devices.

In some embodiments, it is contemplated that an organization which employs a DCKM framework would first acquire DCKM enabled devices. Such devices may have a pre-installed DCKM software application ("app") and/or certain specific hardware and/or firmware to perform the required DCKM functions. In some embodiments, these devices may have the capability to communicate with each other using conventional network connectors such as BNC, RJ45 etc. over network cables such CAT5 or CAT6 which may use IPV4, IPV6 or any other appropriate network communication protocols. However, any suitable or desirable hard wired or wireless connection may be used if desired (e.g., fiber optic, WiFi etc.).

In other embodiments, certain pre-existing network devices may be configured to be DCKM compliant, for example, by installation of a secure application, either by direct interaction ("hands on" hardware or software installation) or secure remote installation (software, firmware or configurable hardware such as FPGA, etc.).

Figure 3:
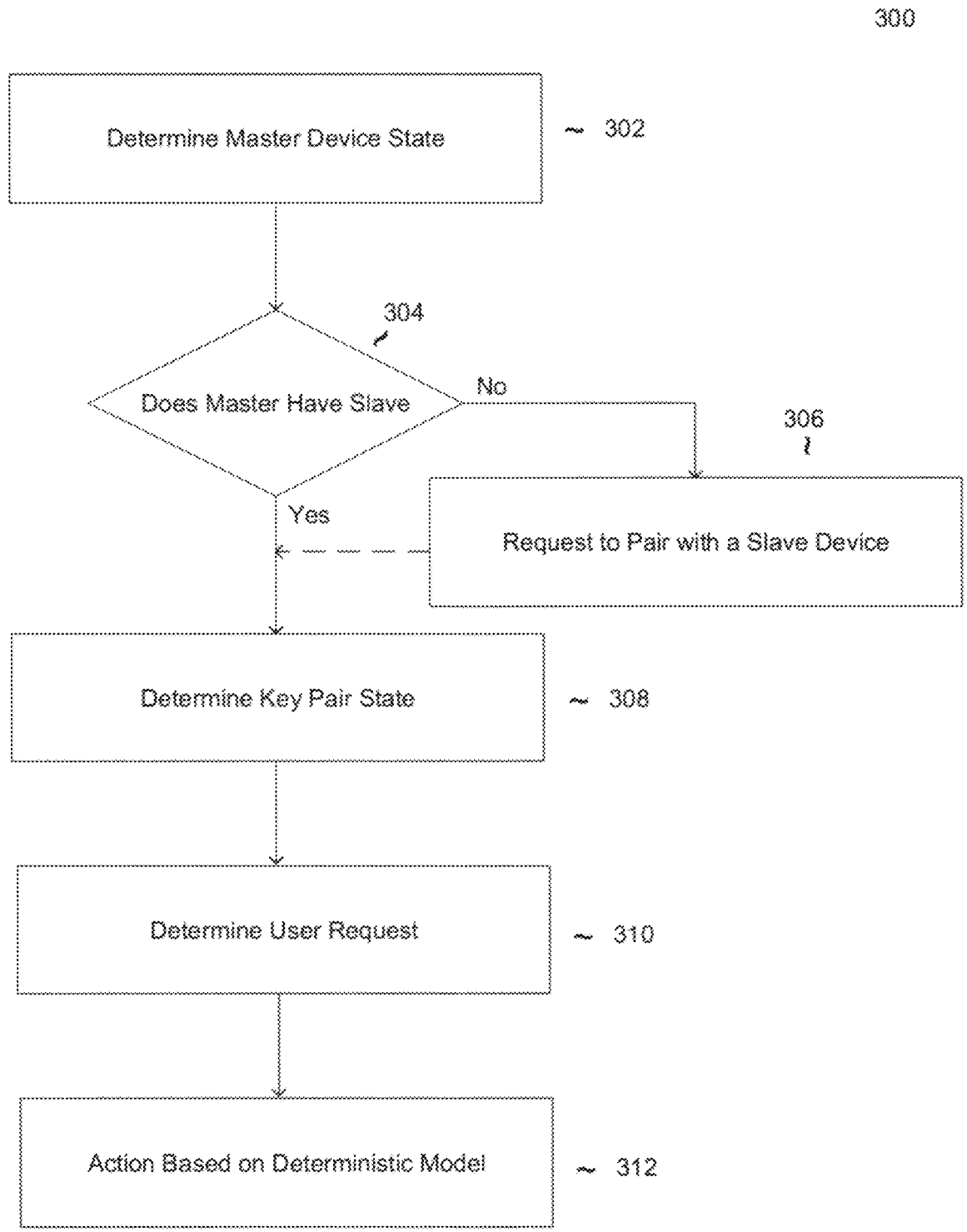
FIG. 3 shows a flow chart illustrating some of the steps involved in pairing a master and slave device in accordance with one embodiment of the present invention.

One approach to managing dynamic cipher keys (sometimes referred to herein as "key") in a network in accordance with one aspect of the present invention is shown in flow chart 300 of FIG. 3. As shown, at step 302 the state of one or more master devices may be determined. This may include key type, initialization vector and current key state information. Next, at step 304 slave devices associated with the master device may be determined. This may include slave device type, network location (IP address etc.) and whether the identified device is DCKM compliant or needs to be configured as such.

If no slave devices are recognized, the master device may request to pair with certain slave devices (step 306). Such a request may be generated by polling available (slave) devices by device type, network location, and DCKM status and/or configuration. Once slave devices have been identified, the state of the master and slave devices may be determined. If the slave device is paired with the master already, then the user can invoke commands to establish a secure cryptographic tunnel with the master and all other slave devices pair with the master on the same "VLAN". In this case, the term VLAN may apply to a specific cryptographic tunnel from 1 to 4096 that a master can uniquely segment from other slave devices that the master is paired with.

Next, at step 310 the user requests from the master the state of slave device to determine if it is available or not. This may be accomplished by exchanging state information on the slave device that indicates the status of the slave device. The state information of the device can be exchanged with any master device with or without a trusted relationship between the two devices. If the slave device is not paired with another master device, then the master device can establish a trusted relationship with the slave device and the slave device enters a state of "PAIRED". Once determined, in some embodiments, the key state of the master and slave may be synchronized such that they may generate common outcomes based on similar or identical input (e.g., depending on key type, symmetric, asymmetric, etc.).

At this point, a deterministic model/policy may be used to determine and dynamically issue a cipher key to the master and slave the devices to ensure the secure delivery of electronic data to the desired endpoint in the network via a secure transmission channel (step 312). Such deterministic models may include any suitable known such models such as, but not limited to AES (Advanced Encryption Standard), DES (Data Encryption Standard), Triple DES, Diffie-Hellman, RSA or any other suitable technique. Communication between master, slave and endpoint will be governed by workflow outcomes (e.g., outcome of encoding/decoding process) and both master and slave will invoke/create the appropriate actions and responses based on this model.

In some embodiments, the rule based cipher key management policy used in accordance with aspects of the present invention may comply with the guidelines set forth in the NIST Special Publication 800-57 Part 1 Revision 4 for providing dynamic creation and delivery of cipher keys, which is hereby incorporated by reference in its entirety.

For example, in operation, paired master slave devices may transfer encoded electronic data based on a symmetric or asymmetric encryption key common to these devices. Such keys may be locally generated and dynamically deployed by the DCKM module in the master/slave device during (or prior to) data transfer by the module in advance of or during the data transfer. Thus, substantially each time data is transferred, a new key is dynamically generated, thereby creating a secure communication path, making key interception and ciphertext decoding exceptionally difficult.

Embodiments of the invention using a deterministic model for key generation may follows a set of rules on supported master/slave devices such as some or all the following: Paired devices have a master/slave relationship within the context of the DCKM framework.

Master devices may have a one to many master/slave relationship.

Master devices may pair with slave devices that are in an "unowned" or slave device pre-activation state.

Master devices may be preconfigured for a specific customer and/or operator(s) before deployment.

Operators may only be allowed to work on master devices that have been assigned to them.

Operators may require two factor authentication (e.g., password and biometric) to manage the master device.

Unowned slave devices have no master relationship

Unowned slave devices may be paired with any master

Owned slave devices may seek their master device and generally cannot be paired with another master device.

Slave devices may have their master device changed (in some embodiments, this may require a master device to give permission via a trusted operator).

Another embodiment of the invention may store and forward private cipher keys utilizing a private multi-segment blockchain technology for large scale key management of endpoint devices.

A blockchain may be thought of as a type of distributed ledger, comprised of unchangable, digitally recorded data in packages called blocks.

These digitally recorded "blocks" of data are typically stored in a linear chain. Each block in the chain contains data (e.g. bitcoin transaction), and is cryptographically hashed. The blocks of hashed data rely upon the previous block data in the chain, ensuring all data in the overall "blockchain" has not been tampered with and remains unchanged.

Private blockchains, sometimes called permissioned ledgers allow for distributed identical copies of a block(s), but only to a limited amount of trusted participants only.

In operation, cipher key storage process of the instant invention extends the conventional blockchain storage functionality described above to further enhance the already secure storage of information by establishing a private multi-segment blockchain. In a preferred embodiment, DCKM of the present invention has a set of interface rules that enable the interconnect of blockchains to prevent outside users from accessing the cipher keys.

Figure 4:
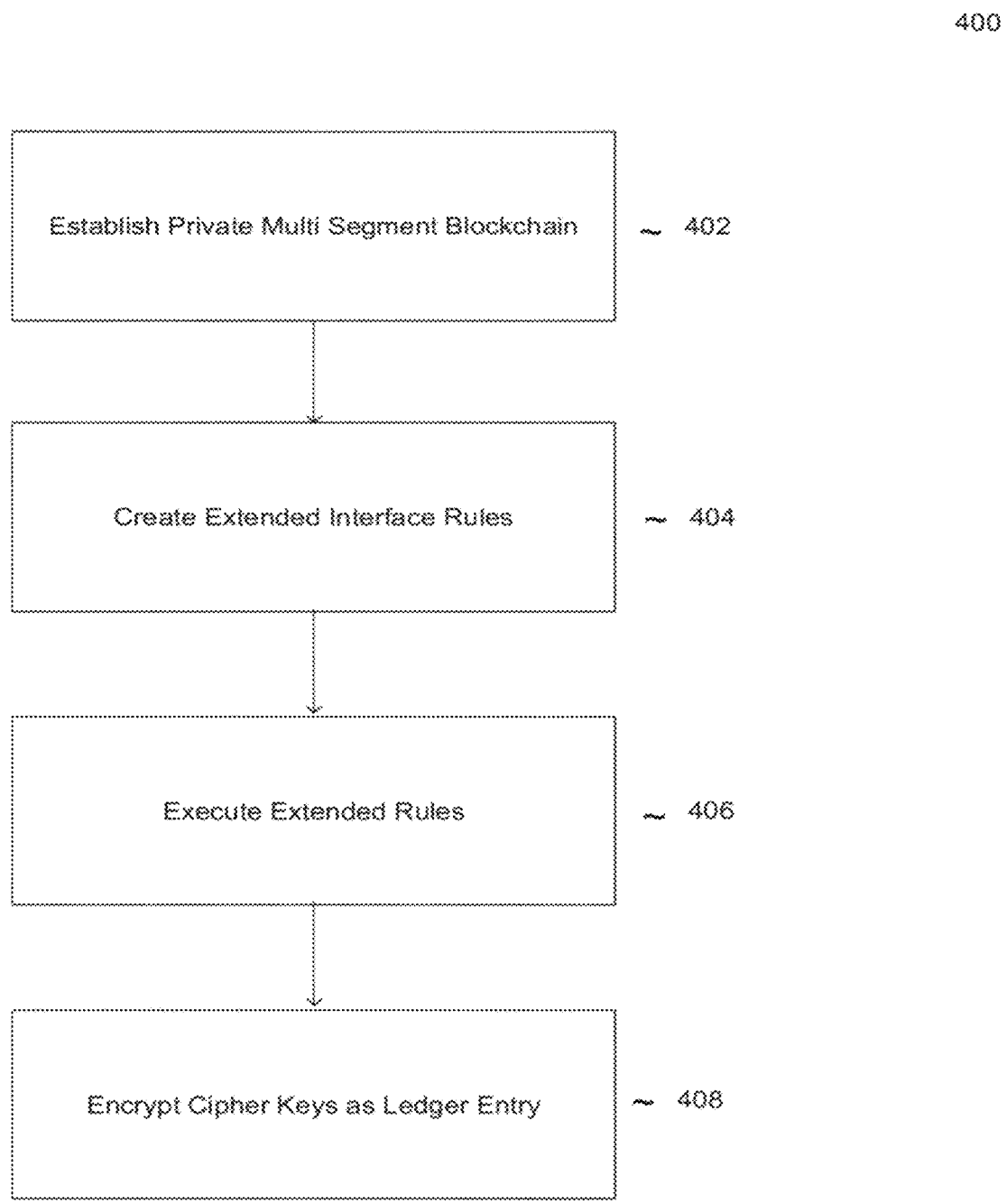
FIG. 4 show a flow chart illustrating some of the steps involved in establishing a unique private blockchain in accordance with one embodiment of the present invention.

Turing now to FIG. 4, a flow chart 400 illustrating some of the steps involved in a blockchain implementation of the current invention are shown. At step 402, a framework for deploying a private multi segment blockchain interconnection system may be created. This may involve some or all of the steps shown in FIGS. 2 and 3. It may further include the pre-configuration and/or deployment of a deterministic model/policy for dynamically issuing cipher keys to master and slave the devices to ensure the secure delivery of electronic data to the desired endpoint in the network via a secure transmission channel. Such deterministic models are based an any suitable known blockchain/distributed ledger technology such as BitCoin, Ethereum, Ripple, Hyperledger, MultiChain, Eris, etc.

Next, at step 404 extended interface rules between various master slave network elements are created. This may include the nesting of blockchains, as well as, the creation of unique blockchains per customer. In the multi-segment blockchain embodiment, the issue of management of user permissions when mining is solved. For example, the resultant benefit of DCKM's process is that the blockchain's activity is private and can only be seen by chosen participants (master/slave pairs). The DCKM process adds better controls for transactions and removes the miner from having to provide proof of work since cost are no longer demanded for work done. In a closed system, the blockchain will only contain transactions which are of interest to those participants that have negotiated the cipher keys.

Next, at step 406 execute extended interface rules between various master slave network elements are created. This may include passing the ledgers for new cipher keys to another master device to manage.

Next, at step 408, cipher keys are encrypted as ledger entries. In operation, as data is transmitted across the network from trusted device to trusted device (master/slave), the cipher from the previous network element is hashed and added as a ledger entry and provided to the next network element in the transmission chain. This information is used to either decrypt the information at an end point or is iteratively added on a network element by element as the information passes through the network to increase the security of the data.

Based on the rules as stated above, DCKM's deterministic model define the actions taken based on the state that both the master and slave devices are in and establishes the workflow outcome expectations.

Beyond controlling access to cipher keys, this type of cryptography enables any message to be signed by a user to prove that they own the private key corresponding to a particular address.

DCKM extended the rules of engagement that occurs when two blockchains interconnect:

Each blockchain presents its identity as a public address on the endorsed list.

Each blockchain verifies that the other's address is on its own version of the endorsed list.

Each blockchain sends a challenge message to the other party.

Each blockchain replies with a signature of the challenge message, thereby proving ownership of the private key corresponding to the public address they presented.

It will be understood that these steps are merely illustrative, and are not meant to be comprehensive or necessarily performed in the order shown. Persons skilled in the art will appreciate that the present invention can be practiced by other than the described embodiments, which are presented for purposes of illustration rather than of limitation, and the present invention is limited only by the claims which follow.

The invention claimed is:

1. A method of creating a secure communications channel across the Internet or other network environment comprising:

providing a secure blockchain based application on a computing device having one or more transactional applications;

providing a cryptographic communications module for use by the secure blockchain based application using a hashing function from the cryptographic communications module as a seed to create a cipher trust key in conjunction with the one or more of the transactional applications;

establishing a trust relationship between two or more computing devices based on the cipher trust key;

using a network interface device to couple a trusted computing device to one or more remote trusted computing devices over the network;

creating a secure communications channel between the trusted computing device and the one or more remote trusted computing devices;

creating a set of extended interface rules including nesting of blockchains and unique blockchains per customer;

segmenting of a private blockchain having one or more existing hashes into one or more new segments;

limiting viewing of activity of the private blockchain to one or more chosen participants as master/slave pairs; and linking the one or more new segments with one or more new hashes based on the set of interface rules.

2. The method of claim 1 further comprising posting a unique identity record containing a cipher trust key in a private blockchain node.

3. The method of claim 1 further comprising enabling a previous segment of the private blockchain to be archived without compromising the integrity of new cipher trust keys.

4. The method of claim 3 wherein the enabling further comprises archiving an active segment of the private blockchain, wherein a new hash for linking an archived segment to the existing active segment of the blockchain is created.

5. The method of claim 3 wherein the enabling further comprises updating the private blockchain based on changes to a remote device, which includes one or more of the following: a cipher trust key, network address, operational characteristics, and availability.

6. The method of claim 1 wherein the cryptographic communications module comprises, at least in part, specialized semiconductor circuitry device.

7. The method of claim 6 wherein the specialized semiconductor circuitry device is a secure device deployed at an endpoint node.

8. The method of claim 6 wherein the specialized semiconductor circuitry device is tamper-resistant and includes one or more of the following: a public/private key pair (Endorsement Key); a Storage Root Key (SRK); and Attestation Identity Key (AIK).

9. The method of claim 4 further comprising an application that can retrieve transactions in archived private blockchain segments.

10. The method of claim 4 further comprising an application that determines a point in time to write a new transaction into an active private blockchain segment.

11. The method of claim 4 further comprising preconfiguring the secure blockchain based application on some master devices, slave devices, or other devices that write or read transactions in the private multi-segment blockchain.

12. The method of claim 4 further comprising registering the secure blockchain based application into a private multi-segment blockchain in order to create additional transactions based on changes to a device's state.

13. The method of claim 4 further comprising creating a custom ledger in a private multi-segment blockchain using an identity record that contains state and/or cipher trust keys for master and slave devices with the secure blockchain based application that are a part of a master/slave trust relationship.

14. The method of claim 4 wherein network devices have a unique transaction ledger for all of their secure blockchain based applications and each manufacturer have their own private multi-segment blockchain node.

15. The method of claim 4 further comprising an application that reads a state of the master device and slave device, and using a deterministic model establishing an action to create a trust relationship between the master and slave devices.

16. The method of claim 4 further comprising identifying master slave device pairs in a network.

17. The method of claim 1 for protecting security of electronic data transmitted across a network comprising:
   identifying a master device coupled to the network;
   identifying a slave device coupled to the network;
   selectively pairing the slave device and the master with one another; and dynamically generating a session cipher key at the master device and the slave device when electronic data is transmitted such that a secure data path is created between the master device and the slave devices.

18. The method according to claim 1, further comprising:
   consulting only one or more related segments of the linking set of hashes for validation when updating the private blockchain to add a new entry and not updating the entire private blockchain when adding a new entry.

\* \* \* \* \*